Feb. 15, 1927. 1,617,589
E. H. GOLD
FLEXIBLE PIPE CONNECTION
Original Filed Oct. 11, 1924
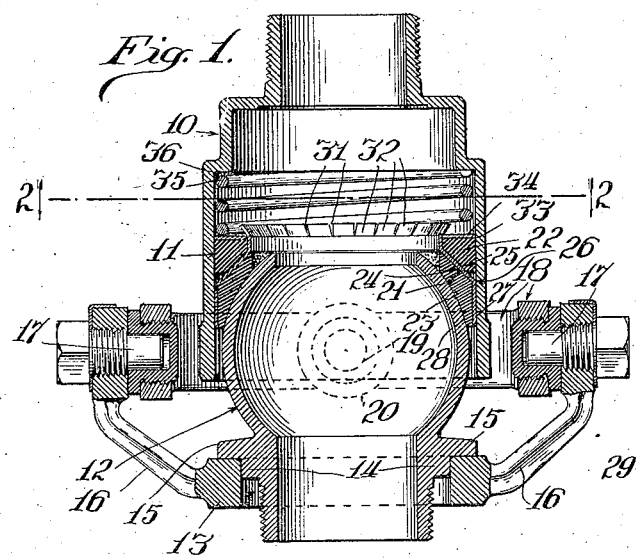
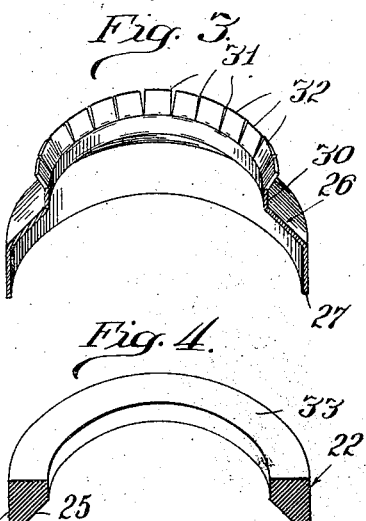
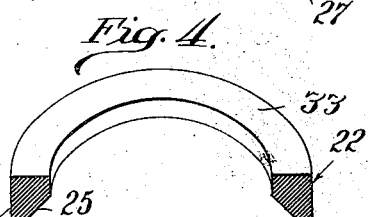
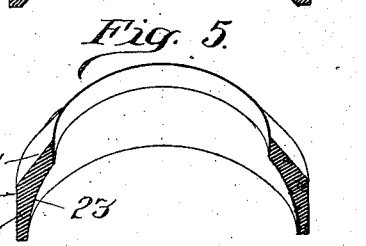
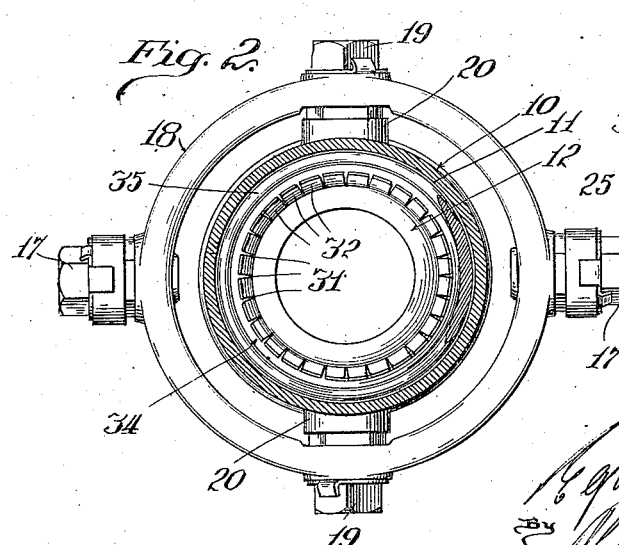
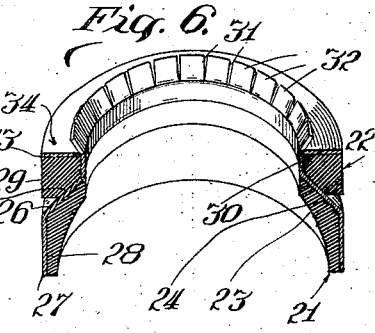
Inventor
Egbert H Gold
By Barnett Freeman
Attorneys Patented Feb. 15, 1927.

1,617,589

UNITED STATES PATENT OFFICE.

EGBERT H. GOLD, OF CHICAGO, ILLINOIS.

FLEXIBLE PIPE CONNECTION.

Original application filed October 11, 1924, Serial No. 743,091. Divided and this application filed June 20, 1925. Serial No. 38,465.

My invention relates to a gasket, and more particularly to a gasket intended to seal the parts of a flexible joint comprising a ball member extending within, but out of frictional contact with an interiorly cylindrical socket member with which the ball member is flexibly articulated for example by means of a gimbal joint construction. Flexible pipe joints of this sort have been provided with gaskets of rubber composition, Jenkins material for example, which are exteriorly cylindrical to fit the cylindrical bore of the socket and are tapered at their outer ends so as to fit against the ball member of the joint. As the surface in contact with the ball wears, due to the vibratory movements of the members of the joint, the gasket slides along the socket to take up this wear. The gasket is, in fact, constantly pressed against the ball member by means of a spring or by fluid pressure in the joint, or both.

The primary object of my present invention is to improve upon a gasket of this type so as to obtain better and more reliable sealing action. The result is accomplished by making the gasket in two sections which have wedging relation one upon the other. This wedging action, made effective through longitudinal thrust of the gasket, tends to force one of the members inwardly against the ball member of the joint and the other outwardly against the socket member.

This application is a division of my copending application 743,091, filed October 11, 1924.

The invention is illustrated, in a preferred embodiment, in the accompanying drawing wherein—

Fig. 1 is a longitudinal sectional view of a pipe joint provided with the gasket of my invention.

Fig. 2 is a cross sectional view on line 2—2 of Fig. 1.

Figs. 3, 4 and 5 are sectional perspective views of the three elements of the gasket, shown separately, and Fig. 6 is a similar view of the gasket with the parts assembled.

The flexible joint shown in the drawing is intended particularly for use as an element of an all-metal pipe connection for use in connecting the train pipes on adjacent cars of a railway steam train, and is constructed as follows: 10 is a socket member having an interior cylindrical surface 11. 12 is a ball member which projects into the end of the socket member and is articulated therewith so as to be out of frictional contact with the so-called socket member. As shown, a collar 13 is swiveled on the neck portion 14 of the ball member against a shoulder 15. This collar is formed with diametrically arranged arms 16 pivoted by means of studs 17 to a ring 18 which surrounds the ball member and the outer end of the socket member. The ring 18 is pivoted by studs 19 to bosses 20 on the ball member. This arrangement constitutes a gimbal joint which holds the ball member centered in the socket member with capacity for universal angular movement, within certain limits, and also with capacity for swiveling movement with respect to the socket member.

The gasket or packing for sealing the relatively movable conduit members 10 and 12 consists of outer and inner annular gasket members 21 and 22 which, because of their configuration, have a wedging action one on the other when pressure is exerted against the inner end of the inner member. Member 21 is referred to as the outer gasket member and member 22 as the inner gasket member because of the positions of these members with respect to the outer end of socket member 10. The member 21 is preferably made of a rubber composition, of the type, for example, known as Jenkins material, consisting of rubber mixed with asbestos. The inner member 22 may be made of the same material but is preferably formed of a somewhat softer rubber composition. While the rubber composition of the Jenkins material type is relatively hard when cold, it is softened somewhat at the temperature of steam so that when the gasket is used in a joint connecting steam train pipes it is not essential that the inner member be of softer composition.

The outer gasket member 21 is formed interiorly with a preferably spherical surface 23 to fit the ball member 12 and exteriorly, at the other end of said member, with a beveled surface 24.

The inner gasket member 22 is formed interiorly with a beveled surface 25 corresponding in angularity to the beveled surface 24 on member 21. A conical metal ring 26 is interposed between surfaces 24 and 25. This ring may be provided, although this is optional, with an outwardly projecting flange 27 forming an armoring for the cylindrical outer surface 28 of gasket member 21, in which case the over-all diameter of member 21 is a trifle less than the over-all diameter of member 22, the outer cylindrical surface 29 of which is intended to bear against the cyindrical surface 11 of socket member 10. The metal ring 26 is preferably formed with an upstanding flange 30 having a plurality of slits 31 in its edge so as to provide ears 32 which may be bent back to hold in place on the inner surface 33 of member 22 an annular washer 34. The metallic ring 26, 27 may or may not be cemented or molded to the gasket member 21.

Preferably a spring 35 is interposed between a shoulder 36 on the socket member 10 and washer 34. This spring, when used, tends to force the gasket into the space between the ball member and the socket member. When the joint is under fluid pressure the pressure of the fluid accomplishes the same result.

In either case, when pressure is exerted against the gasket tending to move it as a whole in the direction of its length, a wedging action takes place between the two members 21 and 22 of the gasket whereby member 21 is forced against the ball 12 while member 22 is forced against the cylindrical surface 11 of the socket member 10. In other words, the inner member 22 is wedged into the space between the cylindrical surface 11 and the conical ring 26 with the double effect of increasing the effectiveness of the seal as between the gasket and surface 11, and at the same time compressing the member 21 against the ball 12. This operation is especially effective because of the softened condition of the material of which members 21 and 22 are formed due to the heat of the steam passing through the joint.

As the surface 23 of the outer gasket member 21 wears, the wear being considerable because of the consequent flexing movements as between conduit members 10 and 12, the wear is taken up automatically by the outward movement of the gasket under the action of fluid pressure and spring 35.

I do not intend to make any claim herein to the invention described in terms broad enough to cover the alternate species disclosed in the parent case, Serial No. 743,091, above referred to as claims generic to both species are made in the parent case.

I claim:

1. A flexible pipe connection, comprising an interiorly cylindrical socket, a ball projecting within but not in contact with the wall thereof, connecting means between the ball and socket preventing disengagement but allowing universal relative angular movements thereof, a gasket member slidable in the cylindrical recess and having a curved face bearing against the inner portion of the ball, a conical ring bearing on said gasket member, and another separate gasket member of soft material pressed between the ring and the wall of the socket.

2. A flexible pipe connection, comprising an interiorly cylindrical socket, a ball projecting within but not in contact with the side wall thereof, connecting means between the ball and socket preventing disengagement but allowing universal relative angular movement thereof, a gasket member slidable in the cylindrical recess and having a curved face bearing against the inner portion of the ball, a conical ring bearing on the gasket, another separate gasket member of soft material pressed between the ring and the wall of the socket, and a compression spring mounted between the socket and the last named gasket member.

3. A flexible pipe connection, comprising a socket having a substantially cylindrical recess, a ball projecting within said recess but not in contact with the side wall thereof, connecting means between the ball and socket preventing disengagement but allowing universal relative movements thereof, a gasket member of relatively hard material slidable in the cylindrical recess and having a curved face to bear against the ball, a conical metallic ring behind the gasket, and a separate gasket member of softer material than said first named member adapted to be pressed between the ring and the wall of the recess.

4. A flexible pipe connection comprising a socket having a substantially cylindrical recess, a ball projecting within said recess but not in contact with the wall thereof, connecting means between the ball and socket preventing disengagement but allowing universal relative movements thereof, a gasket member slidable in the cylindrical recess and having a curved forward face to bear against the ball, and a conical rear face providing a tapered recess between the rear portion of the gasket and the walls of the socket, a thin metallic conical ring behind the gasket, and a gasket member of softer material than the other gasket member adapted to be pressed into the tapered recess between the ring and the socket.

5. A flexible pipe connection comprising a socket having a substantially cylindrical recess, a ball mounted in the recess but not in contact with the wall thereof, connecting means between the ball and socket preventing disengagement but allowing free universal angular movements between them, a gasket member slidable in the cylindrical recess and having a curved face to bear against the ball, a cylindrical outer face, and a conical rear face providing a tapered recess between the gasket and the wall of the socket, a metallic element enclosing the cylindrical and conical faces of the gasket, and a gasket member adapted to be pressed into the tapered recess between the metallic element and the wall of the socket.

6. A flexible pipe connection comprising a socket having a substantially cylindrical recess, a ball mounted in the recess but not in contact with the wall thereof, connecting means between the ball and socket preventing disengagement but allowing free universal angular movements between them, an outer gasket member slidable in the cylindrical recess and having a curved face to bear against the ball, a cylindrical outer face, and a conical rear face providing a tapered recess between the gasket and the wall of the socket, a metallic follower enclosing the cylindrical and conical faces of the gasket, an inner gasket member adapted to be pressed into the tapered recess between the follower and the wall of the socket, a flat rigid washer behind said inner gasket member, and a spring mounted between the washer and a portion of the socket.

7. In a flexible pipe connection, the combination of a ball, a socket and a gasket freely movable longitudinally in the socket comprising a member having a curved face adapted to bear against the ball, and a conical rear face providing a tapered recess between said member and socket, and a second gasket member adapted to be pressed into this recess by the fluid pressure within said pipe connection.

8. In a flexible pipe connection, the combination of a ball, a socket, a gasket freely movable longitudinally in the socket comprising a gasket member having a curved face adapted to bear against the ball and a conical rear face providing a tapered recess between the member and socket, a second gasket member in this recess, and a spring for forcing the ring into the recess.

9. In a flexible pipe connection, the combination of a ball, a socket, and a gasket freely movable longitudinally in the socket comprising a gasket member of relatively hard material having a curved face to bear against the ball and a conical face providing a tapered recess between the member and socket, and a gasket member of relatively soft material pressed into this recess.

10. In a flexible pipe connection, the combination of a ball and a socket, a gasket freely movable longitudinally in the socket comprising a gasket member of relatively hard material having a curved face to bear against the ball and a conical face providing a tapered recess between the member and socket, an inner gasket member of relatively soft material, and a spring mounted between the socket and the inner gasket member to press the ring into said tapered recess.

11. In a flexible pipe connection, the combination of a ball, a socket, a gasket freely movable longitudinally in the socket comprising a gasket member of relatively hard material having a curved face to bear against the ball and a conical face providing a tapered recess between the member and socket, a metallic follower behind said member, and a gasket member of relatively soft material pressed into said recess.

12. In a flexible pipe connection, the combination of a ball, a socket, a gasket freely movable longitudinally in the socket comprising a member of relatively hard material having a curved face to bear against the ball and a conical face providing a tapered recess between said member and socket, a metallic conical ring behind said gasket member, a gasket member of relatively soft material pressed into the recess, a flat metal washer behind said last named gasket member, and a spring compressed between the washer and a portion of the socket.

13. In a flexible pipe connection, the combination of a ball, a socket, a gasket freely movable longitudinally in the socket comprising a member of relatively hard material having a curved face to bear against the ball, a cylindrical outer face, and a conical rear face providing a tapered recess between the member and the socket, a metallic follower enclosing the cylindrical and conical faces of the ring, and a relatively soft gasket member pressed into the tapered recess between the follower and the socket.

14. In a flexible pipe connection, the combination of a ball, a socket, a gasket freely movable longitudinally in the socket comprising a member of relatively hard material having a curved face to bear against the ball, a cylindrical outer face, and a conical rear face providing a tapered recess between the member and the socket, a metallic follower enclosing the cylindrical and conical faces of said member, a relatively soft gasket member pressed into the tapered recess between the follower and the socket, a flat metal washer behind the last named gasket, and a spring compressed between the washer and a portion of the socket.

15. In a flexible pipe connection, the combination of a ball, a socket and a gasket slidable within the socket against the inner end of the ball comprising an outer member to bear against the ball and an inner member bearing against the end of the outer member, each member being a complete annulus of resilient material and said members being formed with coengaging wedge faces so that outward pressure against the inner member causes it to be wedged between the outer member and the socket wall.

16. In a flexible pipe connection, the combination of a ball, a socket, and a gasket positioned between the ball and socket comprising two members each a complete annulus of resilient material, said members being provided with coengaging wedge faces whereby longitudinal pressure on the gasket expands one member radially and compresses the other member radially.

17. In a flexible pipe connection, the combination of a ball, a socket, and a gasket positioned between the ball and socket comprising two members each a complete annulus of resilient material, said members being provided with coengaging wedge faces whereby longitudinal pressure on the gasket expands one member radially and compresses the other member radially, and a conical metallic ring between said wedge faces.

18. In a flexible pipe connection, the combination of a ball, a socket, and a gasket positioned between the ball and socket comprising two members each a complete annulus of resilient material, said members being provided with coengaging wedge faces whereby longitudinal pressure on the gasket expands one member radially and compresses the other member radially, in combination with a spring for exerting pressure against one end of the gasket.

19. A flexible pipe connection, comprising a socket having a substantially cylindrical recess, a ball projecting within said recess but not in contact with the wall thereof, connecting means between the ball and socket preventing disengagement but allowing universal relative angular movements thereof, a gasket member slidable in the cylindrical recess and having a curved forward face to bear against the ball, and a conical rear face providing a tapered recess between the rear portion of the gasket and the wall of said socket, and a separately formed gasket member adapted to be wedged in the tapered recess.

20. A flexible pipe connection, comprising a socket having a substantially cylindrical recess, a ball projecting within said recess but not in contact with the wall thereof, connecting means between the ball and socket preventing disengagement but allowing universal relative angular movements thereof, a gasket member slidable in the cylindrical recess and having a curved forward face to bear against the ball, and a conical rear face providing a tapered recess between the rear portion of the gasket and the wall of said socket, a separately formed gasket member adapted to be wedged in the tapered recess, and a compression spring mounted between the socket and the last named gasket member.

21. A flexible pipe connection comprising a socket having a substantially cylindrical recess, a ball projecting within said recess but not in contact with the wall thereof, connecting means between the ball and socket preventing disengagement but allowing universal relative angular movements thereof, a gasket member slidable in the cylindrical recess and having a curved forward face to bear against the ball, and a conical rear face providing a tapered recess between the rear portion of the gasket and the wall of said socket, a conical ring behind the gasket, and a separately formed gasket member adapted to be wedged between the socket and the ring.

22. A flexible pipe connection comprising a socket having a substantially cylindrical recess, a ball member projecting within said recess but not in contact with the wall thereof, connecting means between the ball and socket preventing disengagement but allowing universal relative movements thereof, a gasket member slidable in the cylindrical recess and having a curved forward face to bear against the ball and a conical rear face providing a tapered recess between the rear portion of the gasket and the wall of the socket, a thin metallic conical plate behind the gasket, a separately formed gasket member adapted to be pressed into the tapered recess between the ring and the socket, and a compression spring mounted between the socket and the last named gasket member.

EGBERT H. GOLD.